Jan. 9, 1968   J. A. ACCIARRI ETAL   3,362,975
SEPARATION OF ALKYL ALUMINUM FROM ALPHA-OLEFINS
Filed Dec. 2, 1966   2 Sheets-Sheet 1

INVENTORS
JERRY A. ACCIARRI
WILLIAM B. CARTER
BY
ATTORNEY

United States Patent Office 3,362,975
Patented Jan. 9, 1968

3,362,975
SEPARATION OF ALKYL ALUMINUM FROM ALPHA-OLEFINS
Jerry A. Acciarri, Ponca City, Okla., and William B. Carter, Baltimore, Md., assignors to Continental Oil Company, Ponca City, Okla., a corporation of Delaware
Filed Dec. 2, 1966, Ser. No. 607,339
3 Claims. (Cl. 260—448)

ABSTRACT OF THE DISCLOSURE

Alkyl aluminum compounds are separated from alpha-olefins by reducing the temperature of the mixture to effect freezing of the latter.

---

This application is a continuation-in-part of copending U.S. Ser. No. 111,748, filed May 22, 1961 and now abandoned.

This invention relates to the preparation of alpha-olefins. In one aspect, it relates to the recovery of alkyl aluminum, such as triethylaluminum, from admixture with alpha-olefins.

Heretofore, several methods have been proposed for the production of higher olefins from lower olefins. In general, these proposed methods have involved the reaction of a trialkylaluminum compound with a lower olefin, specifically, ethylene to form the so-called growth product. After forming the growth product, it is heated in the presence of an additional quantity of ethylene and a finely divided metal catalyst, such as finely divided nickel. Finally, the higher olefin is recovered from the reaction mass by distillation. The former reaction may be illustrated equationwise as follows:

(1)
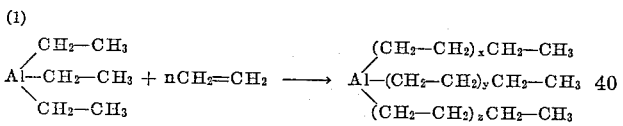

wherein $x$, $y$ and $z$ represent integers ranging from 0–14 (average 3–7) and $x+y+z=n$.

The foregoing reaction is carried out by passing ethylene through triethylaluminum preferably in the presence of a diluent under a wide variety of reaction conditions, e.g., 65°–150° C. and 200–5,000 p.s.i.g., preferably 90°–120° C. and 1,000–3,500 p.s.i.g. It is to be understood that, instead of employing triethylaluminum as the starting trialkylaluminum in the above reaction, other low molecular weight alkyl ($C_2$–$C_4$) aluminum compounds such as tripropylaluminum, tributylaluminum, triisobutylaluminum, diethylaluminum hydride, ethylaluminum dihydride, etc., can be employed; and in lieu of ethylene, other low molecular weight aliphatic mono-1-olefins, such as propylene and the like can be substituted. Generally, $C_2$–$C_4$ olefins are preferred as the growth hydrocarbon compound.

The higher olefins are produced by heating growth product to an elevated temperature in the presence of an additional quantity of ethylene, which process is known as the displacement reaction. The displacement reaction can be carried out in the presence of a displacement catalyst at temperatures from about 50 to about 150° C. for about 1 to about 30 minutes. Alternatively, the displacement reaction can be effected in the absence of a catalyst by utilizing more elevated temperatures from about 280 to about 350° C. for a very short period of time, namely, between about 0.1 and 10.0 seconds. The displacement reactions can be illustrated equationwise as follows:

(2) 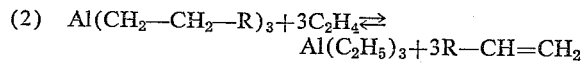

where R=H, $C_2H_5$, $C_4H_9$, $C_6H_{13}$, etc.

It has been suggested that the alpha-olefins and triethylaluminum produced in the displacement reaction can be recovered by fractional distillation. However, considerable difficulty is encountered in the separation of the displacement products from each other by distillation. It has been found that, when triethylaluminum is reacted with ethylene and the resulting growth product is subjected to the displacement reaction, the reaction product will comprise in addition to the solvent the following components listed in order of ascending boiling points:

Ethylene
Butene-1
Hexene-1
Octene-1
Decene-1
Dodecene-1
Triethylaluminum
Tetradecene-1
Hexadecene-1
Octadecene-1
Eicosene-1
Higher olefins; unreacted $AlR_3$ As a specific example, it is impractical to separate triethylaluminum from dodecene-1 by ordinary methods of fractional distillation.

It is, therefore, a principal object of the present invention to provide a process for the production of alpha-olefins which obviates the disadvantages of the prior art processes.

It is another object of this invention to provide a process whereby alpha-olefins containing at least 3 carbon atoms can be produced from ethylene by a process which is economical and simple to operate.

It is yet another object of this invention to provide a process whereby the alpha-olefins can be readily separated from other components in the displacement product.

Still another object of this invention is to provide a process for the separation of triethylaluminum from 1-dodecene and other alpha-olefins.

The foregoing objects are realized broadly by reducing the temperature of an admixture of alkyl aluminum with alpha-olefins until alpha-olefins having a higher freezing point than the alkyl aluminum crystallize from solution, separating the crystals and thereafter recovering alkyl aluminum from the solution.

When the solution contains alpha-olefins having lower freezing points than the alkyl aluminum, separation of the alkyl aluminum from these alpha-olefins can be effected either by distillation or by a further reduction in temperature, whereby the alkyl aluminum is crystallized from solution and can be recovered.

In one aspect of the invention, lighter alpha-olefins are removed from the admixture of alpha-olefins and alkyl aluminum by distillation, after which the higher alpha-olefins are separated by crystallization.

In another aspect of the invention, a mixture of triethylaluminum with alpha-olefins containing from 2 to about 30 carbon atoms is subjected to a series of distillation steps wherein olefins, both lighter and heavier than dodecene, are removed from the mixture; and the remaining 1-dodecene-triethylaluminum fraction is reduced in temperature to preferentially crystallize a portion of the dodecene which can then be separated from the solution. When utilizing this process, a solution of the remaining dodecene and triethylaluminum can be recycled to the growth reaction.

The process of this invention finds application broadly in the separation of alkyl aluminum from alpha-olefins. Within the scope of the term alkyl aluminum are included trialkylaluminum compounds in which the alkyl groups contain from 2 to 10 or higher carbon atoms and also dialkylaluminum hydrides. Specific examples of alkyl aluminum compounds include tripropylaluminum, tributylaluminum, diethylaluminum hydride, triisobutylaluminum, dipropylaluminum hydride, trioctylaluminum, tridecylaluminum, and the like. In the preferred embodiment, the invention is directed to the separation and recovery of triethylaluminum from a mixture of alpha-olefins, for example, olefins containing from 2 to about 30 carbon atoms.

In order to more clearly describe the invention and provide a better understanding thereof, reference is made to the accompanying drawings of which FIGURE 1 is a graph illustrating the freezing point curves of various alpha-olefins in admixture with triethylaluminum;

Figure 2:
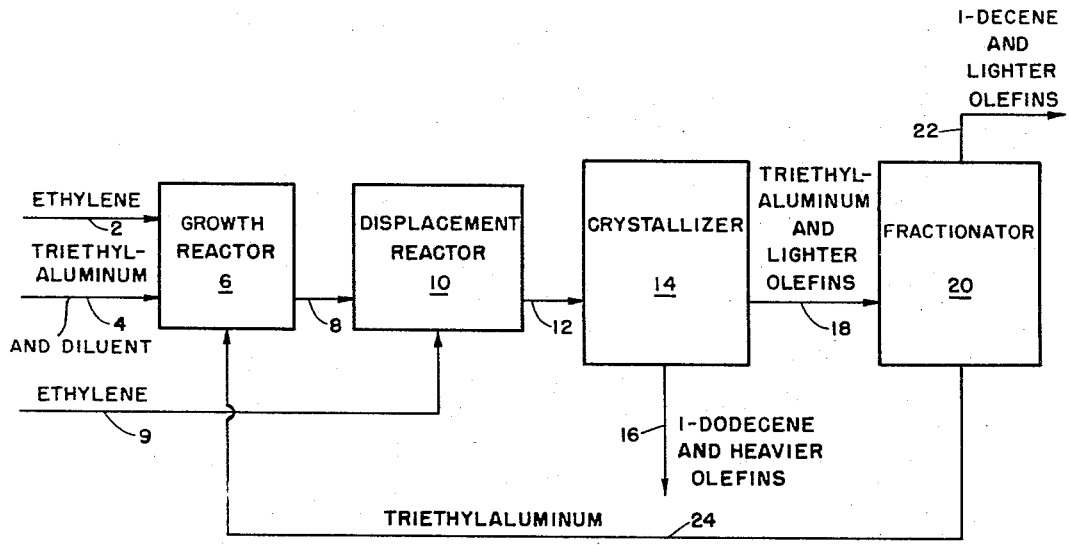
FIGURE 2 is a block diagrammatic illustration of a process for the production of alpha-olefins, including a growth reactor, displacement reactor, crystallizer and fractionator.

Referring to FIGURE 2, ethylene, triethylaluminum and diluent are introduced through conduits 2 and 4, respectively, to a growth reactor 6. In this reactor, the ethylene and triethylaluminum are subjected to elevated temperatures and pressures for a period of time sufficient to effect addition of the ethylene to the triethylaluminum to form a complex admixture of alkyl aluminum in which the alkyl groups vary from about 2 to about 30 carbon atoms. Preferably, the growth reaction is carried out in the presence of a diluent which can be any suitable inert, aliphatic or aromatic hydrocarbon, such as octane, benzene, xylene, heptane, kerosene, and the like. In this instance, kerosene is used as diluent. Upon completion of the growth reaction, the growth product, that is, admixture of alkyl aluminum in diluent plus unreacted ethylene, is removed from the growth reactor 6 through conduit 8 and introduced to displacement reactor 10. In this reactor, the alkyl aluminum is reacted with ethylene under conditions of temperature and pressure such that the ethylene displaces the alkyl groups from the alkyl aluminum to form a product mixture comprising triethylaluminum and olefins containing from 2 to about 30 carbon atoms. The displacement reaction is also preferably carried out in the presence of a diluent; and in this instance, the diluent which is employed is the same as that utilized in the growth reactor. Upon completion of the displacement reaction, the contents of reactor 10 are discharged through conduit 12 into crystallizer 14. The temperature in the crystallizer is then reduced to the point where all of the heavier olefins, that is, 1-dodecane and heavier olefins, are crystallized from solution. The crystallized materials are separated by any conventional means, such as filtration, centrifugation, decantation, etc., and removed from the crystallizer through conduit 16. The cooling required for crystallization can be provided by any suitable conventional refrigeration procedure, for example, by indirect heat exchange with a refrigerant, by introducing a suitable material to the crystallizer and cooling by auto-refrigeration, etc.

The solution which remains in the crystallizer comprising triethylaluminum, 1-decene and lighter olefins and diluent is removed therefrom through conduit 18 and introduced to fractionator 20, which can be any conventional type of distillation tower. In fractionator 20, a separation is effected between the triethylaluminum which is recycled to the growth reactor through conduit 24 and lighter olefins and diluent which are removed from the fractionator through conduit 22.

Figure 3:
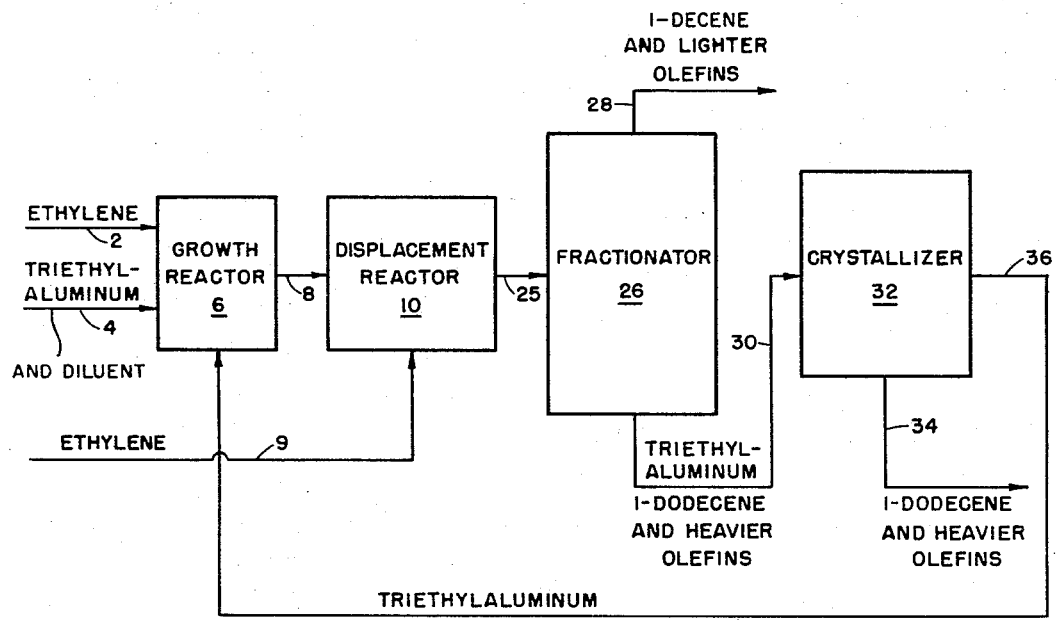
FIGURE 3 is a similar block diagrammatic process in which a fractionator precedes the crystallizer for removal of light olefins.

In FIGURE 3, there is illustrated a variation of the process of FIGURE 2 in which lighter olefins are separated from the displacement product prior to the crystallization step. In the process of FIGURE 3, growth and displacement are again carried out as previously described, with the displacement product being introduced through conduit 25 to a fractionator 26. In the fractionator, 1-decene and lighter olefins plus diluent are vaporized and withdrawn overhead through conduit 28. The bottoms from the fractionator containing triethylaluminum, additional diluent, and the heavier olefins are passed through conduit 30 to crystallizer 32. After a suitable reduction in temperature of the crystallizer, substantially all of the olefins are crystallized; and the triethylaluminum, which remains in the liquid state, is removed from crystallizer 36 and returned to the growth reactor. The solid olefin is removed from the crystallizer through conduit 34.

Figure 4:
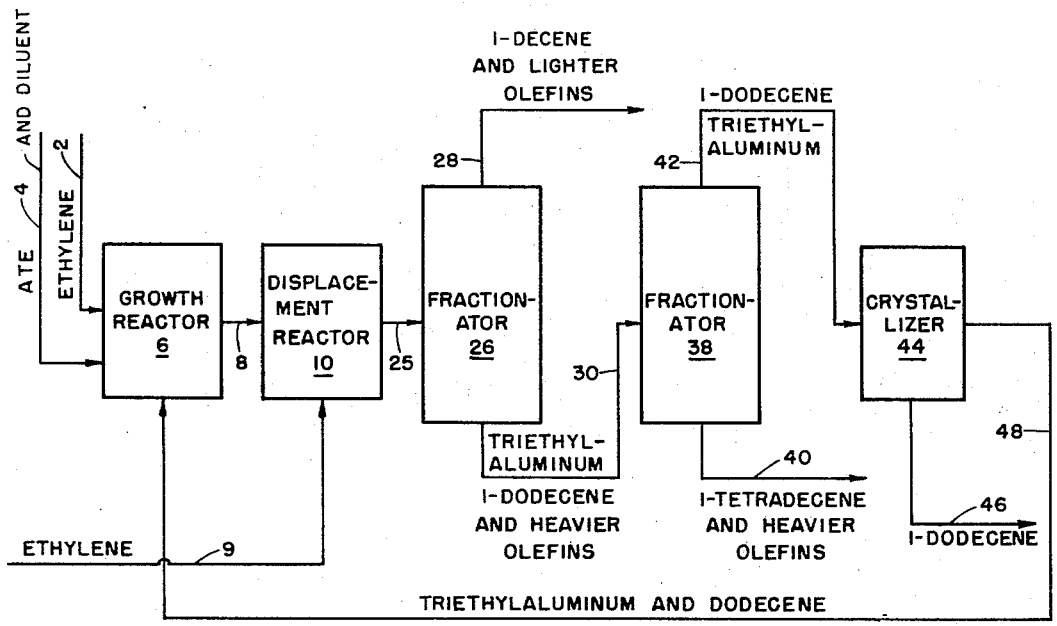
FIGURE 4 is also a block diagrammatic illustration of a process for producing alpha-olefins in which two fractionators precede the crystallizer for the purpose of separating both lighter and heavier olefins.

Still another variation of the process is illustrated by FIGURE 4. Referring to FIGURE 4, growth and displacement are again effected, followed by separation of the lighter olefins and diluent in fractionator 26. The bottoms from fractionator 26 containing triethylaluminum, 1-dodecene, and heavier olefins are introduced to a second fractionator 38, wherein 1-tetradecene and heavier olefins are separated from the triethylaluminum and 1-dodecene. The heavier olefins are withdrawn from the bottom of the fractionator through conduit 40 and a mixture of triethylaluminum, and 1-dodecene is passed overhead through conduit 42 to crystallizer 44. Upon reduction of temperature in the crystallizer, a eutectic point is reached at which the liquid phase contains approximtaely 76 percent by weight of triethylaluminum, and the solid phase is dodecene. The solid dodecene is separated from the liquid, being removed from the crystallizer through conduit 46. The mixture of triethylaluminum and dodecene is returned to the growth reactor from the crystallizer through conduit 48.

While the preceding discussion has been directed to preferred embodiments of the invention, it is within the scope of the invention to effect the separation of alkyl aluminum other than triethylaluminum from olefins as previously pointed out and by the use of fractionation and separation procedures equivalent to those specifically set forth in the description of the drawings.

The following examples are presented in illustration of the invention:

EXAMPLE 1

Freezing point data were obtained for binary mixtures of various alpha-olefins with triethylaluminum. Individual freezing points suitable for determination of a smooth curve were obtained by freezing various mixtures of triethylaluminum with each alpha-olefin. The freezing points which were obtained are presented in the table.

TABLE

| Olefin | Triethyl-aluminum Composition, weight percent | Freezing Point °C. |
| --- | --- | --- |
| 1-dodecene | 0 | −35.4 |
|  | 18 | −37.6 |
|  | 40 | −43.5 |
|  | 59 | −50.6 |
|  | 77 | (¹) |
|  | 100 | −52.2 |
| 1-tetradecene | 0 | −14.1 |
|  | 32 | −20.8 |
|  | 71.4 | −34.1 |
|  | 86.6 | −44.7 |
| 1-hexadecene | 0 | 2.6 |
|  | 31.7 | −4.1 |
|  | 86.6 | −27.8 |
| 1-octadecene | 0 | 17.3 |
|  | 15 | 13.2 |
|  | 35 | 8.5 |
|  | 52 | 3.3 |
|  | 76 | −6.8 |
|  | 86 | −13.2 |

¹ This mixture supercooled; the freezing curve indicated that a eutectic occurred at −57.0° C.

Figure 1:
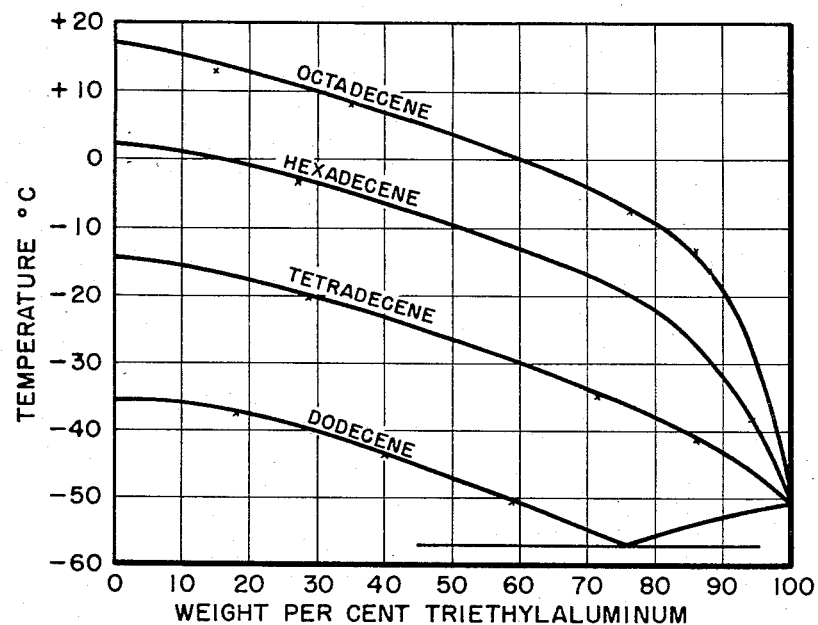

The data in the table are presented in the form of curves in FIGURE 1.

The following examples are presented in illustration of typical commercial applications of the invention. These examples are based on the process flows illustrated by FIGURES 2, 3 and 4:

EXAMPLE 2

*Feed and yield streams*

|  | Pounds |
| --- | --- |
| Ethylene feed to growth reactor 2 | 10,000 |
| Solvent to growth reactor 4 | 2,330 |
| Growth product to displacement reactor 8: |  |
|     Aluminum alkyls | 13,400 |
|     Solvent (1070# recycle dodecene plus 2330# diluent) | 3,400 |
| Ethylene to displacement reactor 9 | 835 |
| Displacement product to crystallizer 12: |  |
|     Olefins (1070# recycle dodecene plus 10,835# olefins displaced) | 11,905 |
|     Triethylaluminum | 3,400 |
|     Solvent | 2,330 |
| Olefins from crystallizer, 1-dodecene and heavier 16 | 5,535 |
| Feed to fractionator 18: |  |
|     Olefins (1070# recycle dodecene plus 5300# light olefins) | 6,370 |
|     Triethylaluminum | 3,400 |
|     Solvent | 2,330 |
| Fractionator overhead 22: |  |
|     1-decene and lighter olefins | 5,300 |
|     Solvent | 2,330 |
| Recycle to growth 24: |  |
|     1-dodecene | 1,070 |
|     Triethylaluminum | 3,400 |

Growth reactor, 1500 p.s.i.a. and 120° C.
Displacement reactor, 225 p.s.i.a. and 288° C.
Crystallizer (final) atmospheric pressure and −56° C.
Fractionator, 0.194 p.s.i.a. and 70° C. at top, 100° C. at bottom

EXAMPLE 3

*Feed and yield streams*

|  | Pounds |
| --- | --- |
| Ethylene to growth 2 | 10,000 |
| Diluent to growth 4 | 2,330 |
| Triethylaluminum recycle 36: |  |
|     Triethylaluminum | 3,400 |
|     1-dodecene | 1,070 |
| Growth product 8: |  |
|     Aluminum alkyls | 13,400 |
|     Diluent (1070# recycle dodecene plus 2330# diluent) | 3,400 |
| Ethylene to displacement 9 | 835 |
| Displacement product 25: |  |
|     Olefins (2330# diluent plus 10,835# olefins displaced) | 13,165 |
|     Triethylaluminum | 3,400 |
|     1-dodecene | 1,070 |
| Fractionator overhead 28: |  |
|     Decene and lighter olefins | 5,260 |
|     1-dodecene | 1,070 |
| Crystallizer feed 30: |  |
|     Dodecene and heavier olefins (5575# olefins plus 1260# diluent) | 7,905 |
|     Triethylaluminum | 3,400 |
| Olefins from crystallizer, dodecene and heavier 34 (5575# olefins plus 1260# diluent) | 6,835 |

Temperature and pressure conditions in all vessels, same as in Example 2.

EXAMPLE 4

*Feed and yield streams*

|  | Pounds |
| --- | --- |
| Fractionator bottoms, 1-tetradecene and heavier 40 (3865# olefins plus 2330# diluent) | 6,195 |
| Fractionator overhead 42: |  |
|     1-dodecene | 1,710 |
|     Triethylaluminum | 3,400 |
| Crystallizer solids, 1-dodecene 46 | 640 |
| Recycle 48: |  |
|     1-dodecene | 1,070 |
|     Triethylaluminum | 3,400 |

Streams 2, 4, 8, 25, 28 and 30 same composition as in Example 3.

Temperature and pressure conditions, same as in Example 2.

Having thus described the invention by providing specific examples thereof, it is to be understood that no undue limitations or restrictions are to be drawn by reason thereof and that many variations and modifications are within the scope of the invention.

We claim:

1. A process for the separation of an alkyl aluminum compound from admixture with alpha-olefins which comprises reducing the temperature of the admixture until alpha-olefins having a higher freezing point than said alkyl aluminum compound crystallize from said admixture, separating said crystals from said admixture, and recovering aluminum alkyl from the remainder.

2. The process of claim 1 wherein the alpha-olefins in said admixture contain from 2 to about 30 carbon atoms, and wherein said alkyl aluminum compound comprises triethylaluminum.

3. The process of claim 2 wherein said step of recovering comprises fractional distillation.

References Cited

UNITED STATES PATENTS

| 1,921,727 | 8/1933 | Britton et al. |  |
| --- | --- | --- | --- |
| 2,889,385 | 6/1959 | Catterall et al. | 260—448 X |
| 2,906,794 | 9/1959 | Aldridge et al. | 260—448 X |

TOBIAS E. LEVOW, *Primary Examiner.*

H. M. S. SNEED, *Assistant Examiner.*